US012736127B2

(12) United States Patent
Braun et al.

(10) Patent No.: US 12,736,127 B2
(45) Date of Patent: Sep. 15, 2026

(54) GEAR ARRANGEMENT FOR A HANDHELD ELECTRICAL APPARATUS, AND HANDHELD ELECTRICAL APPARATUS HAVING THE GEAR ARRANGEMENT

(71) Applicant: Andreas Stihl AG & Co. KG, Waiblingen (DE)

(72) Inventors: Daniel Braun, Freiberg (DE); Markus Hägele, Auenwald (DE); Markus Herrmann, Waiblingen (DE); Sebastian Lechner, Waiblingen (DE); Tobias Reichle, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 3 days.

(21) Appl. No.: 18/734,927

(22) Filed: Jun. 5, 2024

(65) Prior Publication Data

US 2024/0418258 A1 Dec. 19, 2024

(30) Foreign Application Priority Data

Jun. 19, 2023 (DE) ..................... 10 2023 115 954.2

(51) Int. Cl.
*B25F 5/00* (2006.01)
*F16H 19/08* (2006.01)
(Continued)

(52) U.S. Cl.
CPC ........... *F16H 57/0486* (2013.01); *B25F 5/00* (2013.01); *F16H 19/08* (2013.01); *F16H 57/023* (2013.01);
(Continued)

(58) Field of Classification Search
CPC ......................... F16H 57/0423; F16H 57/0424
(Continued)

(56) References Cited

U.S. PATENT DOCUMENTS 2,877,668 A * 3/1959 Kelbel ................ F16H 57/0427 475/135
2,968,190 A * 1/1961 Orr .................... F16H 57/0434 184/6.12

(Continued)

FOREIGN PATENT DOCUMENTS

| CN | 207269417 U | 4/2018 |
|---|---|---|
| DE | 10 2005 048 766 A1 | 5/2007 |
| DE | 10 2014 220 309 A1 | 4/2016 |

*Primary Examiner* — Shelley M Self
*Assistant Examiner* — Patrick B Fry
(74) *Attorney, Agent, or Firm* — Walter Ottesen, P.A.

(57) ABSTRACT

A gear arrangement is for a handheld electrical apparatus, in particular a hedge trimmer. The gear arrangement includes a housing having a first housing section, a second housing section, and a re-lubrication opening for introducing lubricant into the housing. A planetary gear, which defines a central axis, is disposed in the first housing section, for reducing the gear ratio of a driving movement provided by a drive motor of the electrical apparatus. An eccentric gear unit is disposed in the second housing section for converting a rotational movement, of which the gear ratio has been reduced by the planetary gear, into an oscillation driving movement. The first housing section is assigned an inflow opening for introducing lubricant into the first housing section, and a drain outlet for discharging lubricant from the first housing section. A handheld electrical apparatus includes a gear arrangement.

9 Claims, 4 Drawing Sheets

(51) Int. Cl.

| | |
|---|---|
| ***F16H 57/023*** | (2012.01) |
| ***F16H 57/04*** | (2010.01) |
| *A01G 3/053* | (2006.01) |
| *F16H 57/02* | (2012.01) |

(52) U.S. Cl.

CPC ..... *F16H 57/0408* (2013.01); *F16H 57/0423* (2013.01); *F16H 57/0424* (2013.01); *F16H 57/043* (2013.01); *A01G 3/053* (2013.01); *F16H 2057/02034* (2013.01); *F16H 2057/02073* (2013.01)

(58) Field of Classification Search

USPC .................................... 74/467; 475/159, 160

See application file for complete search history.

(56) References Cited

U.S. PATENT DOCUMENTS

| | | | | |
|---|---|---|---|---|
| 2,984,122 | A * | 5/1961 | Woolley .................... | F16H 3/60<br>475/116 |
| 8,667,697 | B2 * | 3/2014 | Hittmann ............... | A01G 3/053<br>30/277.4 |
| 2007/0087891 | A1 | 4/2007 | Schumacher et al. | |
| 2008/0196375 | A1 * | 8/2008 | Berti ...................... | A01G 3/053<br>30/515 |
| 2010/0255945 | A1 | 10/2010 | Schumacher et al. | |
| 2023/0027337 | A1 * | 1/2023 | Ikuta ....................... | F16H 3/005 |

* cited by examiner

GEAR ARRANGEMENT FOR A HANDHELD ELECTRICAL APPARATUS, AND HANDHELD ELECTRICAL APPARATUS HAVING THE GEAR ARRANGEMENT

CROSS-REFERENCE TO RELATED APPLICATIONS

This application claims priority of German patent application no. 10 2023 115 954.2, filed Jun. 19, 2023, the entire content of which is incorporated herein by reference.

TECHNICAL FIELD

The disclosure relates to a gear arrangement for a handheld electrical apparatus, and to a handheld electrical apparatus having the gear arrangement according to the disclosure.

BACKGROUND

Already known from the prior art CN 207269417 U is a gear arrangement for a hedge trimmer, which has a planetary gear and an eccentric gear unit. The planetary gear is disposed in a first housing section, and the eccentric gear unit is disposed in a second housing section. Both housing sections are fluidically separated. For re-lubrication, both housing sections have in each case one dedicated re-lubrication opening.

It has been demonstrated that lifetime lubrication is not sufficient in high-powered electrical apparatuses. Therefore, the user is required to supply lubricant from the outside through the re-lubrication opening to the gear arrangement after a certain period of use. Users often mean well and supply more lubricant than necessary. This “overfilling” does however lead to the gear arrangement demanding a greater output requirement for movement. The output requirement is significantly increased in comparison to a normal filling level, in particular when using planetary gears which rotate at relatively high rotating speeds and are accommodated in a small installation space. The greater output requirement is particularly obvious in electrical apparatuses that are operated with rechargeable batteries and in the overfilled state have only a shortened running time of the rechargeable battery.

SUMMARY

There is, therefore, the object of specifying a gear arrangement which is improved in terms of the disadvantages mentioned.

The disclosure relates to a gear arrangement for a handheld electrical apparatus, in particular a hedge trimmer, including a housing having a first housing section, a second housing section, and a re-lubrication opening for introducing lubricant into the housing, in particular from the outside; an in particular multi-stage planetary gear which has a central axis and is disposed in the first housing section, for reducing the gear ratio of a driving movement provided by a drive motor of the electrical apparatus; an eccentric gear unit, which is disposed in the second housing section, for converting a rotational movement, of which the gear ratio has been reduced by the planetary gear, into an oscillation driving movement. According to the disclosure, the first housing section is assigned an inflow opening for introducing lubricant into the first housing section, and a drain outlet for discharging lubricant from the first housing section. The inflow opening and/or the drain outlet herein can be formed directly in a housing wall of the housing section, or on a component located in the housing section. Excess lubricant which has been introduced inadvertently into the first housing section through the inflow opening can automatically be discharged from the first housing section through the drain outlet during the operation of the electrical apparatus. Overheating of the planetary gear, and an excessive input of power, is avoided in this way, the running time of the rechargeable battery being increased as a result.

The disclosure furthermore relates to a handheld electrical apparatus, in particular a hedge trimmer, having the gear arrangement according to the disclosure.

Handheld electrical apparatuses can be understood to mean various embodiments of an electrical apparatus, in particular operated with rechargeable batteries, in particular electrical gardening apparatuses and/or electrical construction apparatuses, for example a hedge trimmer, rotary scissors, an orbital sander, a jigsaw, an oscillation multi-function tool, or any other embodiment of an electrical apparatus for use in the house, the garden or on a construction site, that appears expedient to a person skilled in the art.

The lubricant is in particular gear grease. The planetary gear as well as the eccentric gear unit are lubricated with gear grease. The planetary gear and the eccentric gear unit are in particular lubricated with the same gear grease.

The gear arrangement is provided to be driven by an electric motor. In comparison to spur gears, the planetary gear reduces the rotating speed of the motor and increases the torque in a relatively compact installation space. A multi-stage planetary gear is used to provide particularly high torques. The gear output of the planetary gear drives a drive shaft of the eccentric gear unit. An eccentric cam which drives an output element in an oscillating manner, that is, in reciprocating manner, is disposed on the drive shaft. The reciprocating movement may be translatory or rotational. The output element can be the tool of the electrical apparatus, or drive the tool. A plurality of eccentric cams for driving a plurality of tools, for example two cutting blades of a hedge trimmer or rotary scissors, can be formed on the drive shaft. The planetary gear and the eccentric gear unit are received in contiguous housing sections of the housing. The housing sections are sections of the housing that are fluidically separated from one another—with the exception of optional lubricant channels incorporated therein. The fluidic separation can be formed by a wall of the housing, and/or components disposed in the housing. The first housing section and the second housing section lie behind one another in the direction of the central axis. The lower side of the in particular lowermost planetary carrier that faces away from the planets forms the geometric partition plane between the first housing section and the second housing section.

In an embodiment, the drain outlet has a spacing from the inflow opening, in particular a radial and/or axial spacing in terms of the central axis. It is ensured as a result of the spacing between the inflow opening and the drain outlet that the lubricant is not already immediately discharged from the drain during the re-lubrication procedure, but is first distributed in the planet gear during operation, the excess lubrication being conveyed away thereafter. It is ensured as a result of the axial spacing that the lubricant is first distributed in all gear stages before being discharged through the drain.

In an embodiment, the inflow opening is closer to the central axis than the drain outlet. The inflow opening lies in particular on the central axis. The lubricant is conveyed radially outward in terms of the central axis by the moving gearwheels of the planetary gear. Therefore, it is particularly effective for the lubricant to be introduced in a central region of the planetary gear, because the lubricant is automatically distributed from there during operation.

In an embodiment, the drain outlet is connected to a drain channel which opens into the second housing section. The excess lubricant herein can first be temporarily stored in the drain channel until the lubricant ultimately makes its way into the second housing section. The eccentric gear unit, which is disposed in the second housing section, is more tolerant in terms of overfilling and has a larger lubricant consumption than the planetary gear, so that the excess lubricant from the first housing section can be buffered in the second housing section and sustainably used therein. Alternatively, it can be provided that the drain channel opens out into the environment outside the gear arrangement.

In an embodiment, the housing has a single re-lubrication opening for both housing sections. In this way, the user can re-lubricate both gears in one re-lubrication procedure. This simplifies and accelerates re-lubrication, because switching between two re-lubrication openings is dispensed with. If the user introduces too much lubricant during the re-lubrication procedure, the lubricant additionally distributes itself among both housing sections.

In an embodiment, the re-lubrication opening is formed on the second housing section, in particular on an end side of the second housing section. Because the electric motor is disposed on the first housing section, a large part of the end side of the first housing section is obscured by the electric motor. By disposing the re-lubrication opening on the second housing section, accessibility for re-lubrication is improved. The end side of the second housing section forms in particular an external side of the electrical apparatus. The re-lubrication opening is in particular closed by a cover flap which is accessible without having to remove claddings of the electrical apparatus.

In an embodiment, the re-lubrication opening and the inflow opening are connected to one another by a lubricant channel, the lubricant channel running through the drive shaft. The lubricant channel makes it possible that lubricant makes its way from the re-lubrication opening directly into the first housing section without the lubricant first flowing through the second housing section. The inflow opening can be formed on the drive shaft if the drive shaft extends into the planetary gear. It can also be provided that the lubricant channel continues into the planetary carrier, and the planet carrier includes the inflow opening. It can also be provided that the planet carrier and the drive shaft are integrally formed, and the lubricant channel runs therein. By forming the lubricant channel in the drive shaft and/or the planetary carrier, a central supply of lubricant to the planetary gear can be implemented in a simple manner with already existing components. The lubricant channel is in particular bored so that different cross sections and consequently flows of lubricant can be implemented as required. Other methods for incorporating the lubricant channel can also be expedient and are fundamentally known to the person skilled in the art.

In an embodiment, a cross channel branches off from the lubricant channel, the cross channel opening into the second housing section on a circumference of the drive shaft. A plurality of cross channels can also be provided. Lubricant from the re-lubrication opening makes its way through the cross channel to the circumference of the drive shaft, in particular to the eccentric cam disposed on the circumference of the drive shaft. The cross channel opens out in particular away from a face on which the eccentric cam and the output element are in contact. In this way, the discharge opening is not blocked by the output element. The lubricant channel formed in the drive shaft can form a type of lubricant reservoir from which lubricant is successively dispensed. The cross section of the cross channel is adapted to the cross section of the lubricant channel. The cross section of the cross channel is in particular adapted to the cross section of the lubricant channel in such a manner that a total of at most 80% of the lubricant introduced through the re-lubrication opening makes its way through all existing cross channels into the second housing section. In particular, at least 40% of the lubricant introduced through the re-lubrication opening makes its way through the cross channel/cross channels into the second housing section.

In an embodiment, the drain channel runs in a peripheral wall of the first housing section, and is at least partially closed in the axial direction relative to the central axis by a cover disk, the cover disk being axially tensioned in relation to a ring gear of the planetary gear, and provided between the ring gear and the cover disk is a spacer which enables a flow of the lubricant from an interior of the ring gear to the drain outlet. As a result of the ring gear bearing on the peripheral wall and being circumferentially closed, the lubricant has to exit the ring gear axially. The spacer prevents the cover disk from axially closing the ring gear.

BRIEF DESCRIPTION OF DRAWINGS

The invention will now be described with reference to the drawings wherein.

DETAILED DESCRIPTION

Figure 1:
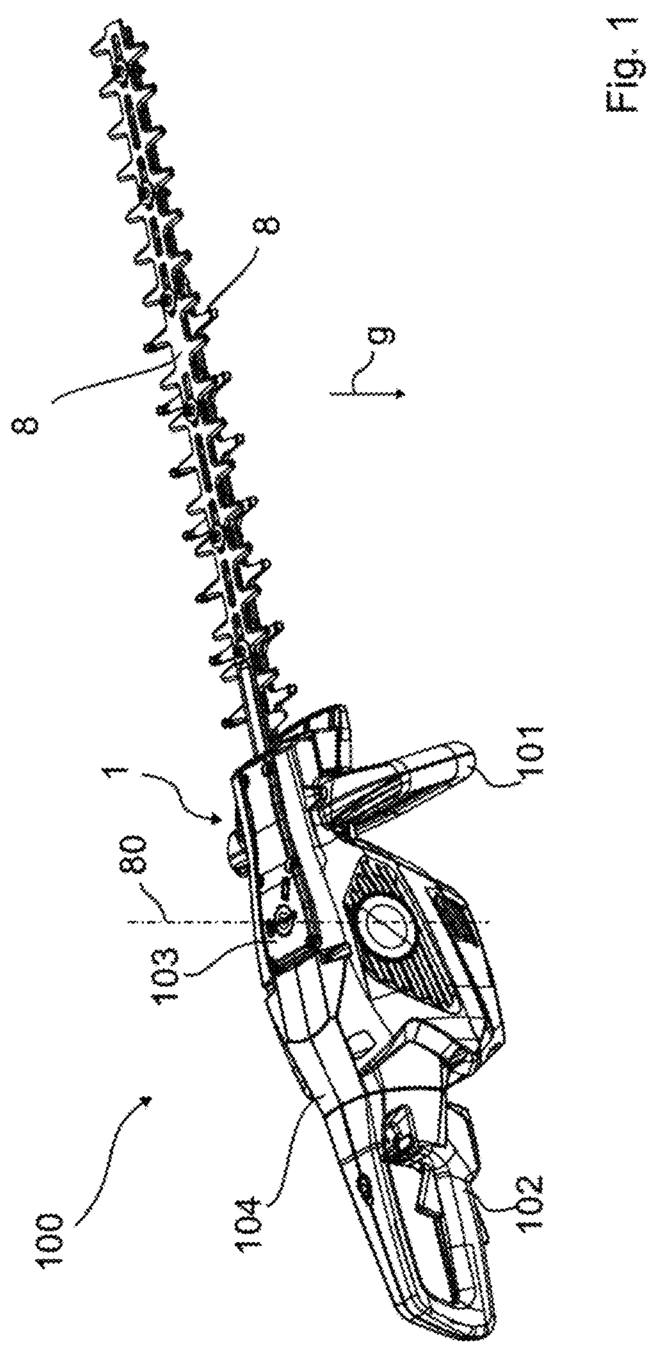
FIG. 1 shows a perspective illustration of an electrical apparatus according to the disclosure, presently in an embodiment as a hedge trimmer, in a re-lubrication position.
Figure 2:
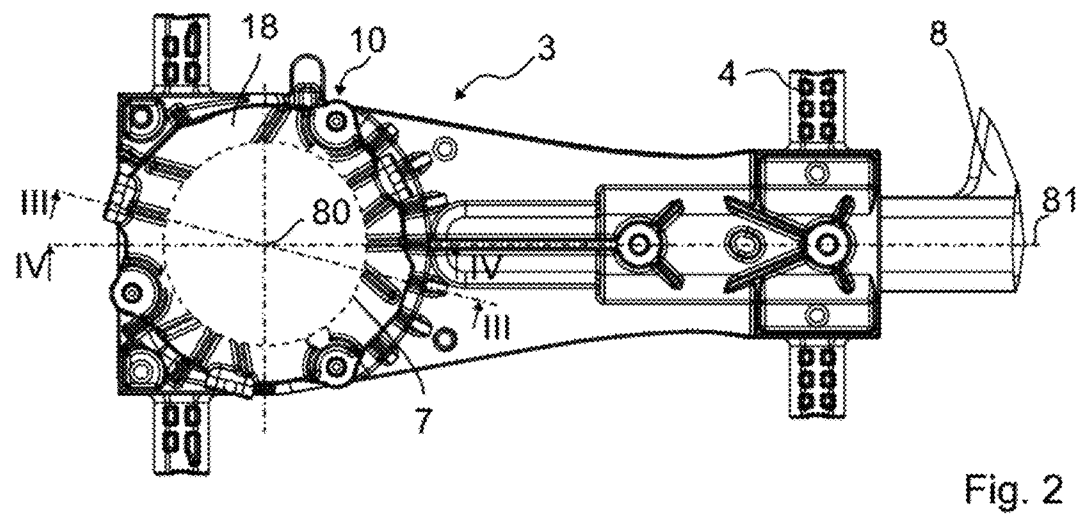
FIG. 2 shows a view from above onto a configuration embodiment of the gear arrangement according to the disclosure along the central axis, having a schematically illustrated electric motor disposed thereon.

FIG. 1 shows a handheld electrical apparatus 100, by way of example in the form of a hedge trimmer operated with rechargeable batteries, having a gear arrangement 1 according to the disclosure for driving cutting blades 8. The hedge trimmer has a front handle 101 in terms of the cutting blades 8, and a rear handle 102 in terms of the cutting blades 8, for guiding the hedge trimmer. The front handle 101 is configured in the shape of a stirrup and is attached to a handle housing 104 in a lower region of the hedge trimmer. The rear handle 102 is connected to the handle housing 104 by way of a rotary joint. As shown in FIG. 2, the gear arrangement 1 includes a housing 3. The housing 3 is connected to the handle housing 104 of the hedge trimmer at connection points 4. The connection points 4 may have damping elements (not illustrated) so as to connect the gear arrangement 1 to the handle housing 104 in a vibration-decoupled manner. The cutting blades 8 protrude from a front side of the gear arrangement 1. A rechargeable battery duct for receiving a rechargeable battery pack is disposed on the handle housing 104. The rechargeable battery pack supplies the electric motor 7, which is fastened to the housing 3, in particular to the first cover 18, with energy. The electric motor 7 can also be supplied from the mains, and the hedge trimmer can have an electrical cable for connecting to the power grid.

Figure 3:
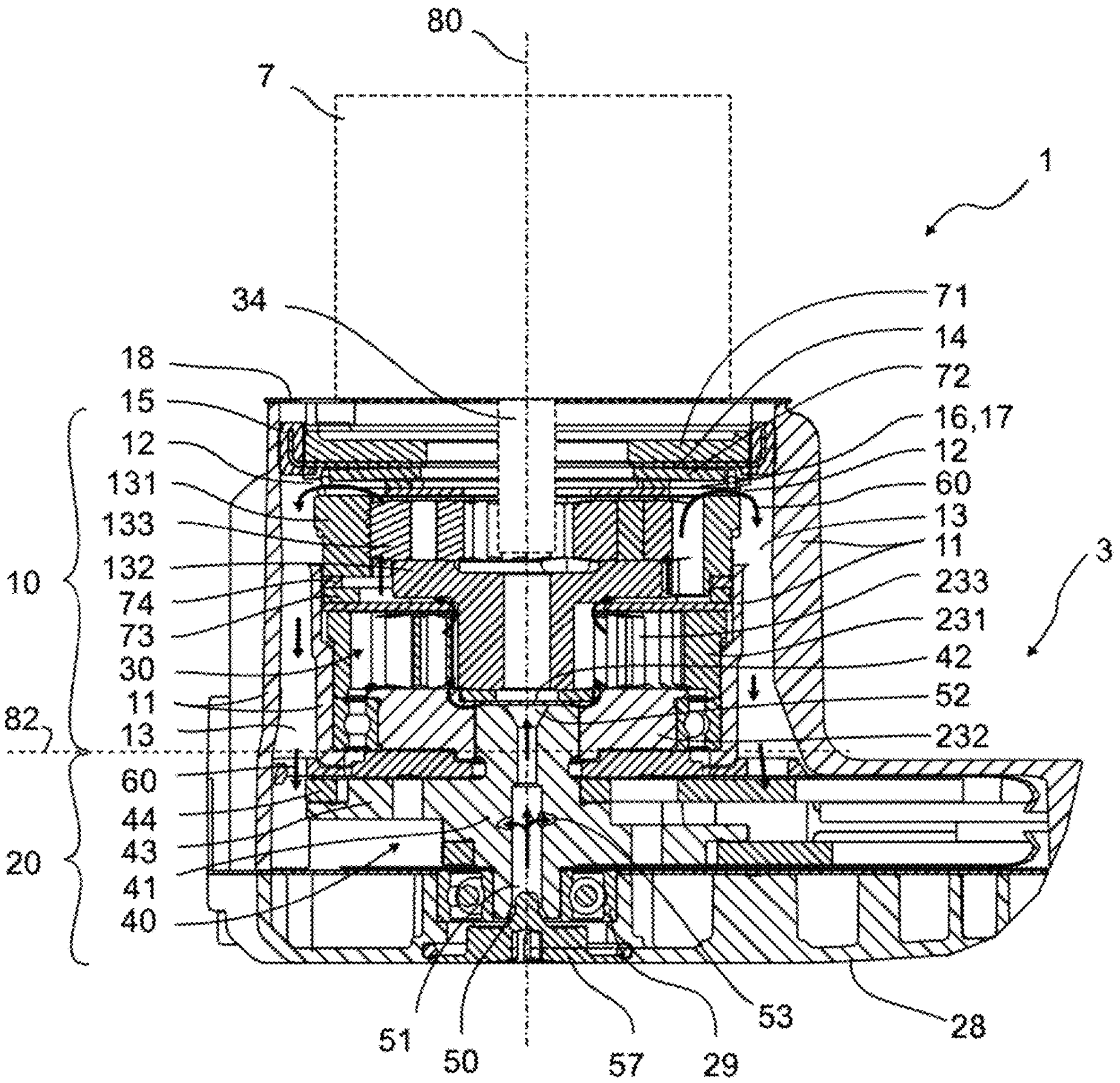
FIG. 3 shows a section illustration of the gear arrangement from FIG. 2, according to the arrows III-III in FIG. 2.

FIG. 3 shows the gear arrangement 1 of the hedge trimmer having a schematically illustrated electric motor 7 in a longitudinal section which runs through the drain channel 13. The electric motor 7 drives a multi-stage planetary gear 30 which reduces the rotating speed of the electric motor 7 and increases the torque in each stage. The planetary gear 30 drives an eccentric gear unit 40 which converts the rotational movement into a translatory movement in order to drive the cutting blades 8 of the hedge trimmer in an oscillating manner. The planetary gear 30 includes a central axis 80 which corresponds to the rotation axis of the sun gear 34. The sun gear 34 is connected to the rotor shaft of the electric motor 7, or is formed by the rotor shaft. The central axis 80 coincides with the longitudinal central axis of the electric motor 7 and the longitudinal central axis of the drive shaft 41 of the eccentric gear unit 40. Depending on the basic configuration of the gear arrangement 1, a faster movement of the cutting blades 8 (trimming cut) or a more powerful movement of the cutting blades 8 (pruning cut) can be provided for the hedge trimmer.

The housing 3 includes a substantially cylindrical first housing section 10 having a peripheral wall 11. The peripheral wall 11 surrounds the ring gears 131, 231 of both gear stages of the planetary gear 30. The housing 3 includes a substantially elongate second housing section 20 which adjoins the peripheral wall 11 of the first housing section 10. The second housing section receives the eccentric gear unit 40. The first housing section 10 and the second housing section 20 lie behind one another in the direction of the central axis 80. The lower side of the planetary carrier 232 of the second gear stage that faces away from the planets 233 forms the geometric partition plane 82 between the first housing section 10 and the second housing section 20. In the embodiment, the planetary carrier 232 of the second gear stage and the bearing of the planetary carrier 232 and the peripheral wall 11 fluidically separate the first housing section 10 and the second housing section 20.

The housing 3 is closed in the axial direction in terms of the central axis 80 by a cover on both sides. The first cover 18 closes the first housing section 10. The electric motor 7 is fastened to the first cover 18. The second cover 28 closes the second housing section 20. The second cover 28 supports a bearing 29 for mounting the drive shaft 41 of the eccentric gear unit 40. The second cover 28 forms an external side, in the embodiment part of the lower side 103, of the hedge trimmer.

A re-lubrication opening 50 for supplying gear grease as the lubricant 60 into the housing 3 from the outside is disposed in the second cover 28. The re-lubrication opening is formed on the end of the drive shaft that protrudes into the second cover 28. The re-lubrication opening 50 is closed by a removable cover flap 57. A lubricant channel 51 which extends longitudinally through the entire length of the drive shaft 41 is formed in the drive shaft 41. The drive shaft 41, by way of its first end 42 that faces away from the re-lubrication opening 50, protrudes into the planetary carrier 232 of the second gear stage. The lubricant channel 51 opens into the first housing section 10 at the first end 42 of the drive shaft 41. The inflow opening 52 for supplying lubricant 60 into the first housing section 10 is formed at the first end 42 of the drive shaft 41. The flow of the lubricant 60 through the gear arrangement 1 is symbolically illustrated by thick arrows in FIG. 3 and FIG. 4.

Figure 4:
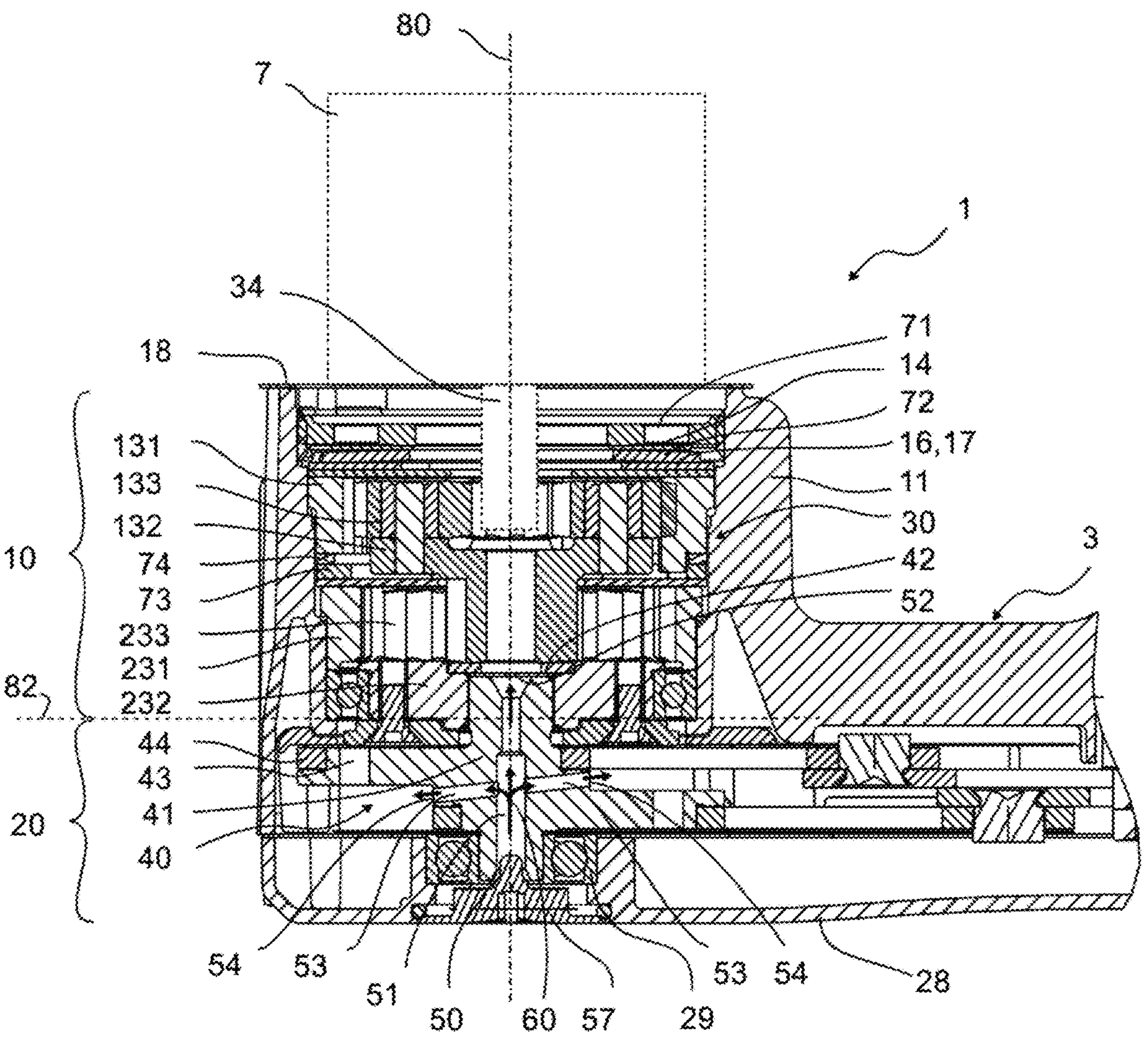
FIG. 4 shows a section illustration of the gear arrangement from FIG. 2, according to the arrows IV-IV in FIG. 2.

FIG. 4 shows the gear arrangement 1 of the hedge trimmer having a schematically illustrated electric motor 7 in a longitudinal section which runs through the cross channels 53. As is shown in FIG. 4, the cross channels 53 branch in each case off from the lubricant channel 51 at the level of eccentric cams 43 that are formed on the drive shaft 41. The cross channels 53 include in each case one discharge opening 54 into the second housing section 20. The cross channels 53 run transversely with respect to the lubricant channel 51. The cross channel 53 runs in particular at an angle of less than 90° in relation to the lubricant channel 51; as a result, the discharge opening 54 in terms of the central axis 80 lies so as to be axially offset from a track of the connecting rod 44. The track is the contact face between the connecting rod 44 and the eccentric cam 43. In this way, lubricant 60 from the discharge opening 54 can exit into the second housing section 20 without the connecting rod 44 blocking the discharge opening 54. The two cross channels 53 are in particular mutually aligned. This simplifies production.

The lubricant channel 51 includes a first cross section at the re-lubrication opening 50 and the branches of the cross channels 53. The cross section is reduced at that end thereof that lies opposite the re-lubrication opening 50. The reduced cross section of the lubricant channel 51 corresponds approximately to the cross section of the cross channels 53. The choice of the cross sections influences how the lubricant 60 supplied to the re-lubrication opening 50 is divided among the first housing section 10 and the second housing section 20.

Figure 5:
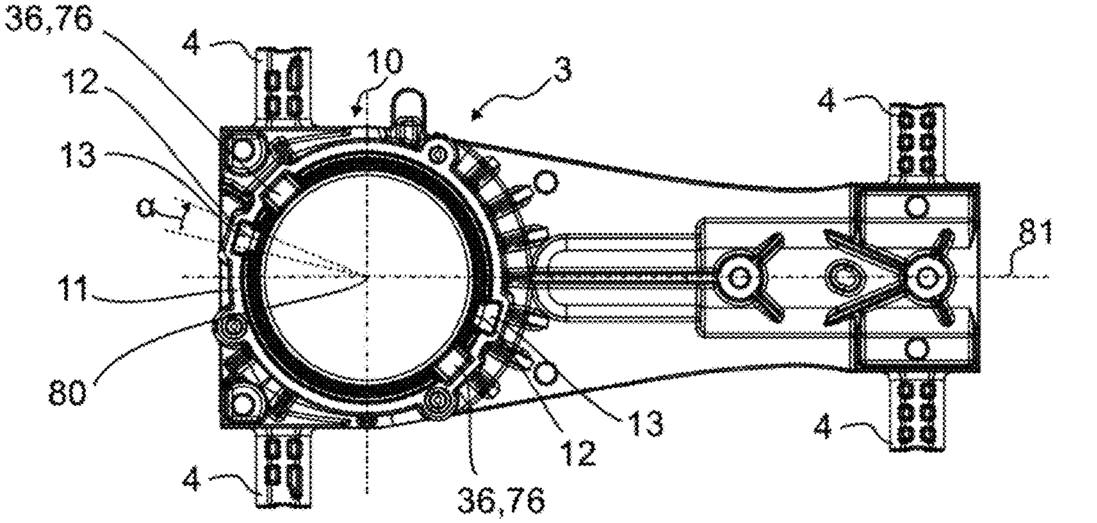
FIG. 5 shows a view from above onto the housing of the gear arrangement from FIG. 2 along the central axis, without a first cover; and, FIG. 6 shows a perspective view of the housing of the gear arrangement from FIG. 2, without the first cover and having part of the components disposed in the first housing section.

The first housing section 10 on its peripheral wall 11 has a drain outlet 12 at the level of the ring gear 131 of the first gear stage. A drain channel 13, which in the embodiment opens into the second housing section 20, extends from the drain outlet 12. The drain channel 13 runs in the peripheral wall 11. In terms of the central axis 80, the drain channel 13 is at least partially closed in the axial direction toward the first cover 18 by a cover disk 14. As is shown in FIG. 5, the drain outlet 12 extends about the central axis 80 across an angle $\alpha$ of the peripheral wall 11 of approximately 5° to 30°, in particular 10° to 20°. The drain outlet 12 and the drain channel 13 are offset from a longitudinal central plane 81 of the gear arrangement 1 in the circumferential direction in terms of the central axis. The longitudinal central plane 81 of the gear arrangement 1 runs through the central axis 80 and the terminal positions of the eccentric gear unit 40. The direction of movement of the cutting blades 8 is reversed in the terminal positions of the eccentric gear unit 40. The eccentric gear unit is illustrated in a position in which it is in a terminal position. As can be seen in FIG. 3, the drain channel 13 is not blocked by the eccentric cam 43, not even in a terminal position of the eccentric. In this way, lubricant 60 can be dispensed into the second housing section 20 at all times. Owing to the fact that the drain channel 13 is laterally offset from the terminal position of the eccentric gear unit 40, the eccentric cam 43 can better distribute the lubricant 60 supplied from the drain channel 13.

In the embodiment, a flywheel, a setting ring 71 for an overload protection, and a clamping device 72 of the overload protection, presently in the form of a plate spring, are also located additionally to the planetary gear 30 in the first housing section 10. The cover disk 14 divides the first housing section 10 into a lubricated and a non-lubricated region. Seals 15 seal the cover disk 14 radially toward the outside in relation to the peripheral wall 11 and radially toward the inside in relation to the sun gear 34 in terms of the central axis 80, so that lubricant 60 bears on the cover disk 14 only on that side that faces the planetary gear 30. The seals 15 can be formed on the cover disk 14 and/or bear on the latter. The clamping device 72 is disposed between the setting ring 71 and the ring gear 131 of the first gear stage. The clamping device 72 can be disposed on that side of the cover disk 14 that faces the ring gear 131, as is illustrated. Alternatively, the clamping device 72 can also be disposed on that side of the cover disk 14 that faces away from the ring gear 131, and in particular have a second seal which closes the drain channel 13. The second seal lies between the external circumference of the clamping device 72 and the peripheral wall 11, so that the second seal is pressed radially against the peripheral wall 11 in terms of the central axis 80 by the deformation of the clamping device 72 when screwing in the setting ring 71.

A spacer 16, in relation to which the cover disk 14 is pre-loaded by the clamping device 72, is disposed on the end side of the ring gear 131. The spacer in the embodiment is formed by two disks with radial clearances. The spacer 16 prevents the cover disk 14 from being pressed against the ring gear 131 in a sealing manner by the clamping device 72. The spacer 16 provides a gap 17 between the cover disk 14 and the end side of the ring gear 131. The height of the gap 17 corresponds to the thickness of the spacer 16, presently the thickness of the two disks. The radial clearances are co-aligned with the drain outlets 12. In particular, the clearance extends in each case about the central axis 80 at least by the same angle as the drain outlet 12. Lubricant 60 which exits the ring gear 118 axially in terms of the central axis 80 can flow radially outward through the gap 17 into the drain opening 12. The spacer 16 can also be integrally formed with the cover disk 14. The height of the spacer 16 influences the cross section through which lubricant 60 can be conveyed away. Owing to the different gear rotating speeds of trimming cut and pruning cut hedge trimmers, mutually different pressure ratios occur in the first housing section 10 during operation. In order not to dispense too much lubricant 60 from the drain opening 12 by virtue of the higher speed and the consequently high pressure, the spacer 16 in the case of trimming cut hedge trimmers is flatter, that is, has a smaller height than in the case of pruning cut hedge trimmers. It can be provided that two disks are used as spacers 16 in the case of the pruning cut hedge trimmer, and only one of these disks is used in the case of the trimming cut hedge trimmer. The overload protection, which is to be described in more detail hereunder, can compensate for the height difference of spacers 16 of different thicknesses.

Provided in the embodiment are two mutually opposite drain outlets 12 including two associated drain channels 13 and clearances. Any other, optionally different, number, for example one and/or three, can also be expedient.

FIG. 1 shows the hedge trimmer in a re-lubrication position. The lower side 103 of the hedge trimmer, which runs substantially parallel and adjacent to the cutting blades 8, points upward in the re-lubrication position, so that the re-lubrication opening 50 disposed on the lower side 103 likewise points upward in the re-lubrication position. The front handle 101 is oriented downward in the re-lubrication position. The hedge trimmer in the re-lubrication position is supported on the ground by way of the stirrup of the front handle 101. For re-lubricating the gear arrangement 1, the hedge trimmer according to FIG. 1 is placed down with its lower side 103 pointing upward, and the cover flap 57 is removed. A lubricant storage container is connected to the re-lubrication opening 50, and lubricant 60 is forced into the re-lubrication opening 50. The lubricant 60 is forced through the lubricant channel 51 into the first housing section 10. From the inflow opening 52 on the first end 42 of the drive shaft 41, the lubricant 60 forces its way into cavities of the planetary gear 30. In the embodiment, the planetary carrier 132 of the first gear stage is mounted in a floating manner in such a way that a gap in the direction of gravity g (FIG. 1) between the planetary carrier 132 of the first stage and the planetary carrier 232 of the second stage is established by turning over the hedge trimmer during re-lubrication, the lubricant 60 easily making its way to the planets 233 of the second stage through the gap. At the same time, the lubricant 60 is also forced through the cross channels 53 into the second housing section 20, and in the latter settles on the discharge opening 54. When the cavities of the second gear stage, and optionally a cavity in the planetary carrier 132 of the first gear stage, are filled the resistance increases and the lubricant 60 now preferably takes the path through the cross channels 53 into the second housing section 20 until lubricant 60 is no longer supplied. After the re-lubrication opening 50 is closed, the hedge trimmer is turned over and is in a customary operating position, with the front handle 101 pointing upward or sideways. As a result of the operation of the hedge trimmer, the excess lubricant 60 is conveyed from the second gear stage into the first gear stage. Further excess lubricant 60 exits the first gear stage through the drain outlet 12 into the drain channel 13. From there, the lubricant 60 can make its way into the second housing section 20 and serve for lubricating the eccentric gear unit 40.

The overload protection represents an individual inventive aspect, which can also be used with any gear arrangement other than the gear arrangement 1 described. The overload protection is adjustable, in particular adjustable from an upper side of the gear arrangement 1. The upper side of the gear arrangement 1 faces the electric motor 7 which is able to be disposed on the gear arrangement. The first cover 18 forms the upper side of the gear arrangement 1. The first cover 18 is removed for adjusting the overload protection. The peripheral wall 11 of the first housing section 10 supports an inner thread 77 (FIG. 6) over part of the axial length of the peripheral wall 11 in terms of the central axis 80. The setting ring 71 supports an outer thread which corresponds to the inner thread. The clamping device 72, which is disposed between the setting ring 71 and the ring gear 131, is compressed, that is, pre-loaded, or destressed, by driving in or driving out the setting ring 71, respectively. The adjustment of the overload protection is performed by the setting ring 71 which exerts a defined pre-load force on the clamping device 72. Furthermore, the overload protection can be adapted to spacers 16 of different thicknesses as a result of the threaded connection between the setting ring 71 and the peripheral wall 11. When using a flatter spacer 16 (for example, in the case of trimming cut hedge trimmers), the setting ring 71 is simply screwed further inward by this difference in thickness. As a result, the overload protection is adaptable in many ways.

The pre-load force that is able to be provided by the threaded connection is limited by the size of the thread. Flap wheels 73, 74 are disposed between the ring gear 131 of the first gear stage and the ring gear 231 of the second gear stage, whereby at least one flap wheel 74 is configured to be co-rotational with the housing 3, and at least one other flap wheel 73 is configured to be co-rotational with the ring gear 131 of the first gear stage. The number of friction pairings is increased by the flap wheels 73, 74, so that a smaller pre-load force is required for achieving the same slip torque. In this way, the pre-load force that can be applied by the setting ring 71 is also sufficient for use in pruning cut hedge trimmers. Additional flap wheels 73, 74 can be provided in order to provide even higher slip torques.

Figure 6:
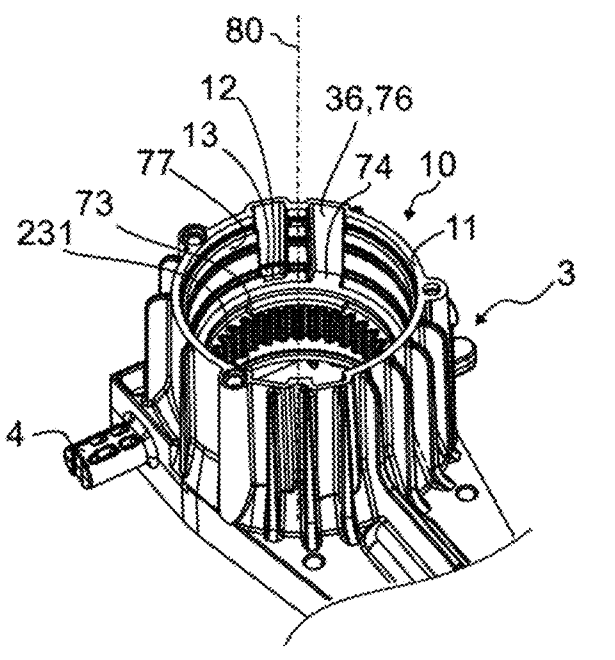

A flap wheel 74, which is co-rotational with the housing 3, is disposed between the ring gear 131 of the first gear stage and the flap wheel 73 which is co-rotational with the ring gear 131 of the first gear stage. The flap wheels 73, 74 are pressed on to one another by the axial pre-load force of the clamping means 72 in terms of the central axis 80, and the ring gear 131 of the first gear stage is fixed relative to the housing 3 in a friction-fitting manner. In the case of an overload, the load exceeds the frictional force in such a way that the friction pairs slip and the ring gear 131 of the first gear stage, including the co-rotational flap wheel 73, rotates relative to the housing 3. The flap wheel 73, which is fixed to the housing, includes a plurality of radially projecting appendages which engage in longitudinal grooves 76 of the first housing section 10 that run longitudinally in terms of the central axis 80 (FIG. 6).

The ring gear 231 of the second gear stage includes a plurality of radially projecting appendages which engage in longitudinal grooves 36 of the first housing section 10 that run longitudinally in terms of the central axis 80. As a result of this form-fit, the ring gear 231 of the second gear stage is disposed so as to be co-rotational in relation to the housing 3. In particular, the longitudinal grooves 36 and the longitudinal grooves 76 are the same longitudinal grooves, as illustrated. The drain channels are disposed between the longitudinal grooves 36, 76 in the circumferential direction in terms of the central axis 80. The drain channels 13 and the longitudinal grooves 36, 76 run in particular parallel to one another so that the production of the housing 3 is simplified. The spacer 16 includes an anti-rotation protection. The anti-rotation protection prevents the spacer 16 from co-rotating with the ring gear 131 and the clearance of the spacer 16 no longer being co-aligned with the drain outlet 12 in the case of an overload. The anti-rotation protection can be configured as a radially projecting appendage on the spacer 16 and a corresponding groove on the housing 3. The groove is in particular formed by the longitudinal groove 36 and/or longitudinal groove 76.

It is understood that the foregoing description is that of the preferred embodiments of the invention and that various changes and modifications may be made thereto without departing from the spirit and scope of the invention as defined in the appended claims.

The invention claimed is:

1. A gear arrangement for a handheld electrical apparatus, the gear arrangement comprising:

a housing having a first housing section and a second housing section;

said housing defining a re-lubrication opening for introducing lubricant into said housing;

a planetary gear defining a central axis and being disposed in said first housing section for reducing a gear ratio of a driving movement provided by a drive motor of the handheld electrical apparatus;

an eccentric gear unit disposed in said second housing section for converting a rotational driving movement, of which the gear ratio has been reduced by the planetary gear, into an oscillation driving movement;

said first housing section being assigned an inflow opening for introducing lubricant into said first housing section and a drain outlet for discharging lubricant from said first housing section; and, wherein said drain outlet is connected to a drain channel which opens into said second housing section.

2. The gear arrangement of claim 1, wherein said drain outlet has a spacing from said inflow opening.

3. The gear arrangement of claim 1, wherein said inflow opening is closer to the central axis than said drain outlet.

4. The gear arrangement of claim 1, wherein said housing defines a single re-lubrication opening for both said first housing section and said second housing section.

5. The gear arrangement of claim 1, wherein said re-lubrication opening is defined on said second housing section.

6. The gear arrangement of claim 1, wherein said re-lubrication opening and said inflow opening are interconnected by a lubricant channel; and, said lubricant channel runs through a drive shaft.

7. The gear arrangement of claim 1 further comprising:

a spacer;

a cover disk;

said planetary gear including a ring gear;

said drain channel running in a peripheral wall of said first housing section;

said drain channel being at least partially closed in an axial direction relative to the central axis by said cover disk;

said cover disk being axially tensioned in relation to said ring gear of said planetary gear;

said spacer being disposed between said ring gear and said cover disk; and, said spacer being configured to enable a flow of lubricant from an interior of said ring gear to said drain outlet.

8. A gear arrangement for a handheld electrical apparatus, the gear arrangement comprising:

a housing having a first housing section and a second housing section;

said housing defining a re-lubrication opening for introducing lubricant into said housing;

a planetary gear defining a central axis and being disposed in said first housing section for reducing a gear ratio of a driving movement provided by a drive motor of the handheld electrical apparatus;

an eccentric gear unit disposed in said second housing section for converting a rotational driving movement, of which the gear ratio has been reduced by the planetary gear, into an oscillation driving movement;

said first housing section being assigned an inflow opening for introducing lubricant into said first housing section and a drain outlet for discharging lubricant from said first housing section;

wherein said re-lubrication opening and said inflow opening are interconnected by a lubricant channel; and, said lubricant channel runs through a drive shaft; and, wherein a cross channel branches off from said lubricant channel; and, said cross channel opens into said second housing section on a circumference of the drive shaft.

9. A handheld electrical apparatus comprising:

a drive motor;

a gear arrangement having a housing, a planetary gear, and an eccentric gear unit;

said housing having a first housing section and a second housing section;

said housing defining a re-lubrication opening for introducing gear grease as lubricant from outside into said housing;

said planetary gear defining a central axis and being disposed in said first housing section for reducing a gear ratio of a driving movement provided by said drive motor;

said eccentric gear unit disposed in said second housing section for converting a rotational driving movement, of which the gear ratio has been reduced by said planetary gear, into an oscillation driving movement; and, said first housing section being assigned an inflow opening for introducing lubricant into said first housing section and a drain outlet for discharging lubricant from said first housing section; and, wherein said drain outlet is connected to a drain channel which opens into said second housing section.

* * * * *